United States Patent
Bakshy et al.

(10) Patent No.: US 9,560,150 B2
(45) Date of Patent: Jan. 31, 2017

(54) ADAPTIVE SELECTION OF SOCIAL CONTEXT FOR DISPLAY TO A VIEWING USER

(71) Applicant: Facebook, Inc., Menlo Park, CA (US)

(72) Inventors: Eytan Bakshy, San Francisco, CA (US); Jeffrey Scott Dunn, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 190 days.

(21) Appl. No.: 14/616,648

(22) Filed: Feb. 6, 2015

(65) Prior Publication Data

US 2016/0234323 A1    Aug. 11, 2016

(51) Int. Cl.
*G06F 15/16* (2006.01)
*H04L 29/08* (2006.01)
*G06Q 50/00* (2012.01)
*G06Q 30/02* (2012.01)

(52) U.S. Cl.
CPC ........... *H04L 67/22* (2013.01); *G06Q 30/0269* (2013.01); *G06Q 50/01* (2013.01)

(58) Field of Classification Search
USPC .... 709/204; 707/748; 379/265.11; 705/14.58
See application file for complete search history.

(56) References Cited

U.S. PATENT DOCUMENTS

| | | | | |
|---|---|---|---|---|
| 8,788,338 B1* | 7/2014 | Ruiz | ................. | G06Q 30/0247 705/14.41 |
| 2011/0137730 A1* | 6/2011 | McCarney | ....... | G06Q 10/06311 705/14.58 |
| 2012/0084160 A1 | 4/2012 | Badros et al. | | |
| 2013/0251137 A1* | 9/2013 | Chishti | ............... | H04M 3/5232 379/265.11 |
| 2014/0119533 A1* | 5/2014 | Spottiswoode | ....... | H04M 3/523 379/265.11 |
| 2015/0006280 A1* | 1/2015 | Ruiz | .................. | G06Q 30/0246 705/14.45 |
| 2016/0170996 A1* | 6/2016 | Frank | ................ | G06F 17/30702 707/748 |
| 2016/0170998 A1* | 6/2016 | Frank | ................ | G06F 17/30702 707/748 |
| 2016/0171514 A1* | 6/2016 | Frank | ................. | G06Q 30/0201 705/7.29 |
| 2016/0234323 A1* | 8/2016 | Bakshy | ................... | H04L 67/22 |

* cited by examiner

*Primary Examiner* — Tammy Nguyen
(74) *Attorney, Agent, or Firm* — Fenwick & West LLP

(57) ABSTRACT

A social networking system selects a set of social endorsements for display within or in conjunction with an advertisement. Candidate social endorsements are identified in response to receiving a request for social endorsements information, each associated with an amount of display space, an affinity with a viewing user, and one or more social networking system objects. The amount of space available to display social endorsement information is determined, and sets of candidate social endorsements are generated to fit within the amount of space available to display social endorsements. The sets of candidate social endorsements are ranked, for instance based on the affinities associated with the candidate social endorsements within each set of candidate social endorsements. A set of candidate social endorsements is selected based on the ranking, and is provided for display within or in conjunction with an advertisement.

20 Claims, 7 Drawing Sheets

ADAPTIVE SELECTION OF SOCIAL CONTEXT FOR DISPLAY TO A VIEWING USER

BACKGROUND

This invention relates generally to online advertising, and in particular to selecting social endorsement information to provide to a user of a social networking system in conjunction with an online advertisement.

Online advertising has evolved into a profitable business, allowing commercial and private entities alike to place advertisements on websites and within native applications, and then display the advertisements to viewing users who access the websites and applications. The ability to analyze data associated with a particular website, application, and/or the viewing user has allowed advertisers to provide ads that are more relevant to a viewing user's interests. More relevant ads increase the likelihood of ad conversion (e.g., that the viewing user will observe the ad, click on the ad, proceed to the advertiser's website, or otherwise respond to the ad with the intended result) and/or the likelihood of greater demand for or awareness of the advertiser's goods or services, thereby raising the effectiveness of the ad.

Ad targeting attempts to increase ad conversion by showing ads that are more relevant to the viewing user's interests. Ads accompanied by social context, such as information about a friend's activities related to the thing being advertised, may further increase the relevance of the ads. Although providing social context information in conjunction with an advertisement increases the advertisement's effectiveness, for any given individual there may be an abundance of social context information available. Current ad systems lack the ability to select the most relevant and effective social information to provide as a social context, or social endorsement, in conjunction with an ad. Therefore, there is a need for a comprehensive solution to identify candidate social endorsements and select the most relevant and effective to provide as social endorsement information in conjunction with advertisements.

SUMMARY

To address the needs of advertisers to maximize the effectiveness of using social networking system data in providing socially relevant advertising to viewing users, embodiments of the invention select a set of candidate social endorsements based on an available social endorsement information display space to provide as social endorsement information for an associated advertisement. In one embodiment, a request is received for social endorsement information to display with an advertisement to a viewing user, where the viewing user is a user of a social networking system. Candidate social endorsements are identified in response to receiving such a request, and can include, for example, text descriptions of interactions between users of the social networking system and objects of the social networking system associated with the advertisement or images of users of the social networking system associated with objects of the social networking system that in turn are associated with the advertisement.

The amount of space available to display social endorsement information is determined. In some embodiments, the amount of space available to display social endorsement information is an amount of dedicated display space within an advertisement or interface associated with the social networking system. The amount of space available to display social endorsement information can vary based on the size of a screen on which the social endorsement information will be displayed. For instance, a tablet or desktop computer monitor may be able to accommodate a greater amount of social endorsement information than a mobile phone display. In some embodiments, the amount of space available to display social endorsement information is measured by the width of the space available to display social endorsement information.

Sets of candidate social endorsements are generated based on the determined amount of space available to display social endorsement information. Each set of candidate social endorsements includes social endorsements associated with footprints such that the sum of space corresponding to the footprints does not exceed the determined amount of space available to display social endorsement information. The sets of candidate social endorsements are ranked, for instance based on a sum or weighted sum of the affinities associated with the candidate social endorsements within each set of candidate social endorsements. A weighted sum of the affinities associated with candidate social endorsements in a set of candidate social endorsements can be determined by weighting each affinity by a weighting factor determined by a position of a corresponding candidate social endorsement within an ordering of the candidate social endorsements. A set of candidate social endorsements is selected based on the ranking, and is provided for display within or in conjunction with an advertisement.

Figure 1:
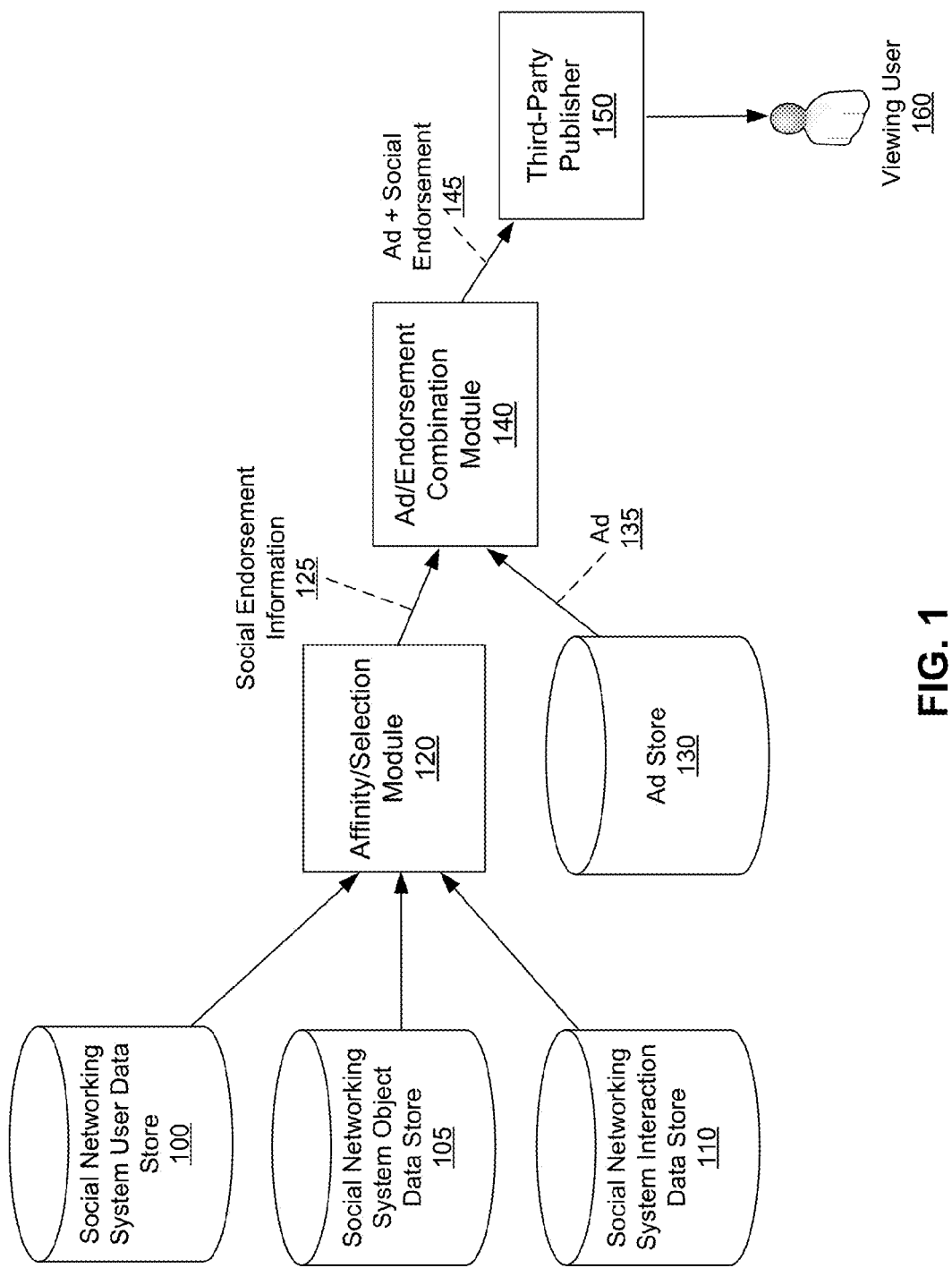
FIG. 1 is a diagram of a process for providing social endorsement information for display with an advertisement, in accordance with one embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Online social networking systems comprise one or more computing devices storing a social network, or a social graph, comprising a plurality of users and providing users of the social networking system with the ability to communicate and interact with other users of the social networking system. Social networking systems allow users to explicitly associate themselves and establish connections with other users of the social networking system. When two users become connected, they are said to be "friends," "contacts," "connections," or "associates" within the context of the social networking system. Alternatively, connections may be automatically created by the social networking system based on common characteristics of the users (for example, users who have had a common employer, have a common friend, or like a common film). Generally being connected in a social networking system allows connected users access to more information about each other than would otherwise be available to unconnected users. Likewise, becoming connected within a social networking system may allow a user greater access to communicate with another user, such as by email (internal and external to the social networking system), instant message, text message, phone, or any other communicative interface. Finally, being connected may allow a user access to view, comment on, download or endorse another user's uploaded content items. Examples of content items include but are not limited to messages, queued messages (e.g., email), text and SMS (short message service) messages, comment messages, messages sent using any other suitable messaging technique, an HTTP link, HTML files, images, videos, audio clips, documents, document edits, calendar entries or events, other user-generated content, and other computer-related files.

Online social networking systems may track objects through the use of a social graph, which includes a plurality of nodes that are interconnected by a plurality of edges. In the social graph, nodes represent objects within the context of the social networking system. Common examples of objects include users, content items, groups, web pages, fan pages, events, messages, concepts, interactions, information, activities, data, computer applications, advertisements or any other entity capable of being represented in a social networking system. Companies, locations, venues, merchants, bands, non-user persons, restaurants, or any other entities may be directly represented by a social networking system object, or may be indirectly represented by an object via a group, web page or fan page within the social networking system dedicated to the entity. For instance, the restaurant "Refuge" or the venue "Orpheum Theatre" may have dedicated objects within the social networking system; alternatively, Refuge may have a fan page and the Orpheum Theatre may have a web page on the social networking system.

An edge between nodes in the social graph represents a particular kind of connection between the two nodes, which may result from an interaction that occurred between the nodes. For instance, for two nodes that represent users, an edge may imply that the users are friends within the context of the social networking system. Alternatively, an edge may imply that the users have communicated with each other, that one user may have viewed the other's profile, that the users attended the same high school, or any other means of connection or interaction. For two nodes where at least one node does not represent a user, an edge may imply similar or different connections or interactions. For example, an edge may indicate a user clicked the "like" button for a group dedicated to a particular band, or that a user clicked on an advertisement. Alternatively, an edge may indicate that two companies, each represented by a social networking system web page, are associated with each other despite no explicit action by either company.

When a new object of a particular type is created, the social networking system may initialize a new node of the corresponding type, may assign a unique object or node identifier to it, and may begin to add data to the object as needed. This might occur, for example, when an individual first becomes a user of the social networking system, when the social networking system generates a new user profile, when a user starts a new group, when a new content item is uploaded to the social networking system, or any other time an object is added to or created within the social networking system. When a new object is created, an edge may be created linking the object node to the node representing the user who created the object. In addition, the social networking system may link the new object node or any existing nodes to other social graph nodes automatically. For instance, if a first user uploads a photograph of a sports bar to the social networking system, and afterwards, a fan page for the sports bar is created, the social networking system may provide an edge between the user node and the fan page node without explicit action by a user. Further, if a second user posts a comment about going to the sports bar on a third user's profile, the second user's and third user's nodes may be automatically connected to the sports bar node without explicit action by either user in regards to the sports bar node.

Users of social networking systems may interact with social networking system objects in a variety of forms, such as by communicating with or commenting on a content item, information or action; clicking a button or link associated with approval (such as a "like" button or the equivalent); sharing a content item, user information or user actions with other users; or downloading or merely viewing a content item. Interaction may also comprise using a computer-based application within the context of the social networking system (such as a video game only accessible and playable from within the social networking system), or an application external to the social networking system (such as a desk top web browser or mobile application) that may or may not interface with the social networking system. Further, interactions also include making a purchase, either in the context of the social networking system, or external to the social networking system; joining, commenting on or subscribing to a social networking system group, web page or fan page; using a mobile device to transmit a current or past location to the social networking system ("checking in" to a location); scheduling a meeting, gathering, errand, vacation, task, objective, reservation, date or any other event or calendar entry; and accepting an invitation to or indicating the intent to attend a meeting, gathering, party, concert, play or any other event. For instance, a user may join a group dedicated to Chopin, may buy tickets to a Chopin performance, may check into the concert hall when the user arrives at the performance, and may post a note to the user's profile reviewing the performance, all of which constitute interactions.

Users of social networking systems may also interact with other users by associating with, connecting to or becoming friends with them, by viewing their profile, by communicating with them, or by having common friends within the social networking system. In addition, a social networking system user may interact with content items, websites, other users or other information outside of the context of the social networking system's web pages that are connected to or associated with the social networking system. For instance, an article on a news web site might have a "like" button that users of the social networking system can click on to express approval of the article. Likewise, a company's website may provide the ability to join a social networking system group dedicated to the company directly from the company's website. These interactions and any other suitable actions within the context of a social networking system may be recorded in social networking system data, which can be used to generate social endorsement information. The social endorsement information may comprise text, images, links, and/or be of any suitable form necessary to convey social endorsement information to a user.

Social endorsement information may be used to provide social context for advertisements that are shown to a particular viewing user. FIG. 1 is a diagram of a process for providing social endorsement information for display with an advertisement, in accordance with one embodiment of the invention. As illustrated, social networking system user data store 100 provides user data and social networking system object data store 105 provides object data to the affinity/selection module 120. In addition, social networking system interaction data store 110 provides interaction data correlated to the provided user data and object data to the affinity/selection module 120. The ad store 130 provides an ad 135 in conjunction with social endorsement information 125 from the affinity selection module 120 to the ad/endorsement combination module 140. The ad/endorsement combination module 140 transmits the ad 135 and social endorsement 145 to the third-party publisher 150 for display to viewing user 160.

User data store 100 stores user information, user account information, user profiles and profile information, user connections, and other user-related data. For instance, user data store 100 may store the identity of a user, the user's account settings, and the social networking system friends of the user. In addition, user data store 100 may store profile information such as biographic, demographic and other types of descriptive information (work experience, educational history, hobbies or preferences, interests, location, and the like). Object data store 105 stores any information relating to objects. This includes descriptive information visible to social networking system users, such as user profile, group profile and fan page profile information; message board contents; user-generated content (such as comments, uploaded photographs and videos, and profile messages); event information; and any other information accessible to social networking system users. In addition, object data store 105 may store object data hidden to users, such as meta-tags, object keywords, category information, search indexes, and any other data accessible to the social networking system but not viewable to social networking system users. Interaction data store 110 stores data about user activities within the social networking system. This includes specific interactions as discussed above, as well as activity levels and usage statistics. Whenever a user interacts with an object, an edge between the user node and the object node may be created in the social graph; this edge may be stored in interaction data store 110. Interaction data store 110 includes information about a particular interaction and may include information about the user node and the object node associated with the interaction. In one embodiment, the interaction data store 110 uses the social graph to identify the object node and the user node associated with an interaction.

In one embodiment, ad 135 is a web-based ad which is displayed in the margins or other dedicated area of a website. In another embodiment, ad 135 is displayed within a software application, video game or a mobile device application. The ad 135 may have a dedicated space within the ad 135 to display social endorsement information 125, referred to as the social endorsement information footprint. Alternatively, the third-party publisher 150 may modify the ad 135 or the area where the ad 135 is to be displayed (referred to as the ad footprint) in order to accommodate the social endorsement information 125. In some embodiments, the ad 135 and the social endorsement information 125 are combined prior to being transmitted to the third-party publisher; in other embodiments, the ad 135 and social endorsement information 125 are transmitted individually and may be combined by the third-party publisher.

These embodiments describing serving social endorsement information are merely meant to be exemplary, and are not intended to be restrictive. In other embodiments, there are more or fewer components performing the same or substantially similar functions as the components of the embodiment of FIG. 1. For instance, the user data store 100, the object data store 105, and the interaction data store 110 may all comprise the same storage entity. In addition, as will be discussed below, in some embodiments, the functionality of the affinity/selection module may be provided by the social networking system; in other embodiments, all or part of this functionality may be provided external to the social networking system. Further examples of providing social endorsement information are found in U.S. patent application Ser. No. 12/898,662, which is hereby incorporated by reference.

System Architecture

Figure 2:
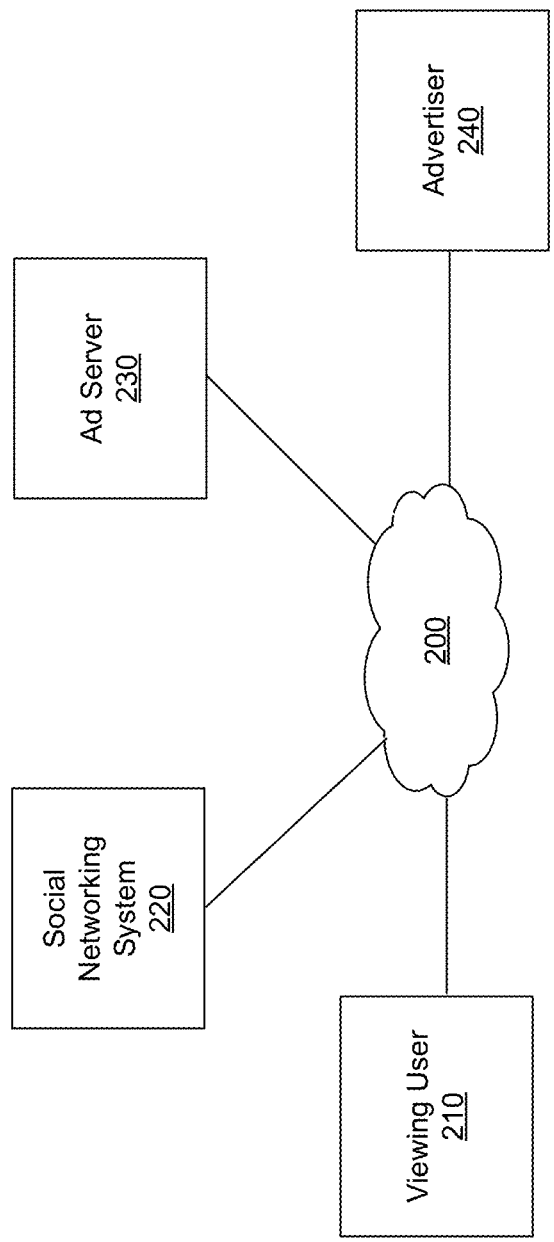
FIG. 2 is a high level block diagram illustrating a system environment suitable for selecting social endorsement information for display with an advertisement to a viewing user, in accordance with one embodiment of the invention.

FIG. 2 is a high level block diagram illustrating a system environment suitable for selecting social endorsement information for display with an advertisement to a viewing user, in accordance with one embodiment of the invention. The system environment comprises a viewing user 210, the viewing user 210 being a member of a social networking system 220, an ad server 230, and an advertiser 240, all of which communicate through a connecting network 200. The connecting network may be the Internet, a local area network, a wireless network or any other network that allows communication between modules. The connecting network 200 may use standard communications technologies and/or protocols. In alternative configurations, different and/or additional modules can be included in the system.

The viewing user 210 may access the connecting network 200 through a website that can display an advertisement, which may comprise one or more web pages, and may be hosted on a web server. Alternatively, the viewing user 210 may access the connecting network 200 via a native application. In such instances, the viewing user 210 may use a computer, a laptop, a netbook, a tablet computer or a mobile device, or any other suitable device which can display an advertisement within a native application running on the device to access the connecting network 200. The ad displayed to the viewing user 210 may comprise text, images, video, audio, or any other ad-related content. The ad may be static, animated, interactive, transparent, mobile, stationary, displayed outside the initial viewing area of a website or application, or in the case of a website, when the website is initially accessed, the ad may constitute its own web page altogether that is displayed when accessing the website. The ad may be displayed by a third-party publisher, which may publish the ad in a website, a mobile application, or any other medium.

The social networking system 220 may comprise a plurality of web pages hosted on one or more web servers. The plurality of web pages may present social networking system information. As discussed above, these pages may include pages for user profiles, group profiles, fan pages, and other social networking system-related pages. These pages may include a variety of social networking system data, such as personal information, user information, user actions, group information, fan page information, endorsement information, content items, user settings, group settings, search results, ads, ad tags, and any other social networking system-related data. The social networking system data is stored in one or more social networking system databases. These databases and all other social networking system components can communicate with the viewing user 210, the ad server 230, the advertiser 240 or any other module through the connecting network 200 via the social networking system web servers. The databases may provide social networking system user data, object data, interaction data or any other social networking system data when by requested another module.

The ad server 230 comprises at least one or more web servers coupled to one or more databases. The databases store a plurality of ads, which may be web-based, specifically tailored for display in an application or on a mobile device, or any other type of advertisement. In addition, the ad server 230 may store a plurality of ad tags, which comprise information that may be coupled to the ad that may identify or otherwise describe the subject matter of the ad, the genre of the ad, the product or service represented by the ad, or any other characteristic, feature or property of the ad. In some embodiments, the ad tags identify specific social networking system objects which may be related to the ad. In one embodiment, the advertiser selects the ad tags; alternatively, the social networking system or any third party may select the ad tags. The ads may be received from advertiser 240 or any other entity capable of providing for delivery by the ad server 230. The ad server's web servers can receive ads for storage and can serve ads from the databases to any module which requests ads. In some instances, the ad server 230 and the advertiser 240 are the same entity. In some instances, the ads and associated ad tags may come from different sources. The ad server 230 may serve an ad with an accompanying one or more ad tags, or the ad server 230 may serve an ad without an accompanying ad tag. The ad server 230, in response to receiving a request for an ad, may in turn request an ad from the advertiser 240; likewise, the ad server 230 may request ad tags from the advertiser 240 or any other module.

The advertiser 240 comprises at least one or more web servers coupled to one or more databases. The databases may store ads to be delivered to the ad server 230 or any other module, and may store ad tags for stored ads or any other ad. The advertiser 240 may generate ad tags for an ad prior to serving the ad to the ad server 230 or any other module. Alternatively, the advertiser 240 may generate ad tags after the ad has been served, for instance in response to a request for an ad tag by the ad server 230 or any other module. Alternatively, instead of ad tags, the ad server 230, the advertiser 240, or any other entity may simply specify which objects in the social networking system the ad is related to for the purposes of this invention. In such an embodiment, the ad server 230, advertiser 240, or other entity may communicate this information directly to the social networking system 220, or may do so through an intermediary. In one embodiment, the objects related to the ad are selected based on the identity of the viewing user 210. In one embodiment, the social networking system 220 determines which objects are related to the ad; this may occur before or after the social networking system 220 receives the ad, learns the identity of the ad, or scans the ad for content. In various embodiments, there are more or fewer components performing the same or substantially similar functions as the components of the embodiment of FIG. 2.

Social Endorsement Selection

Figure 3:
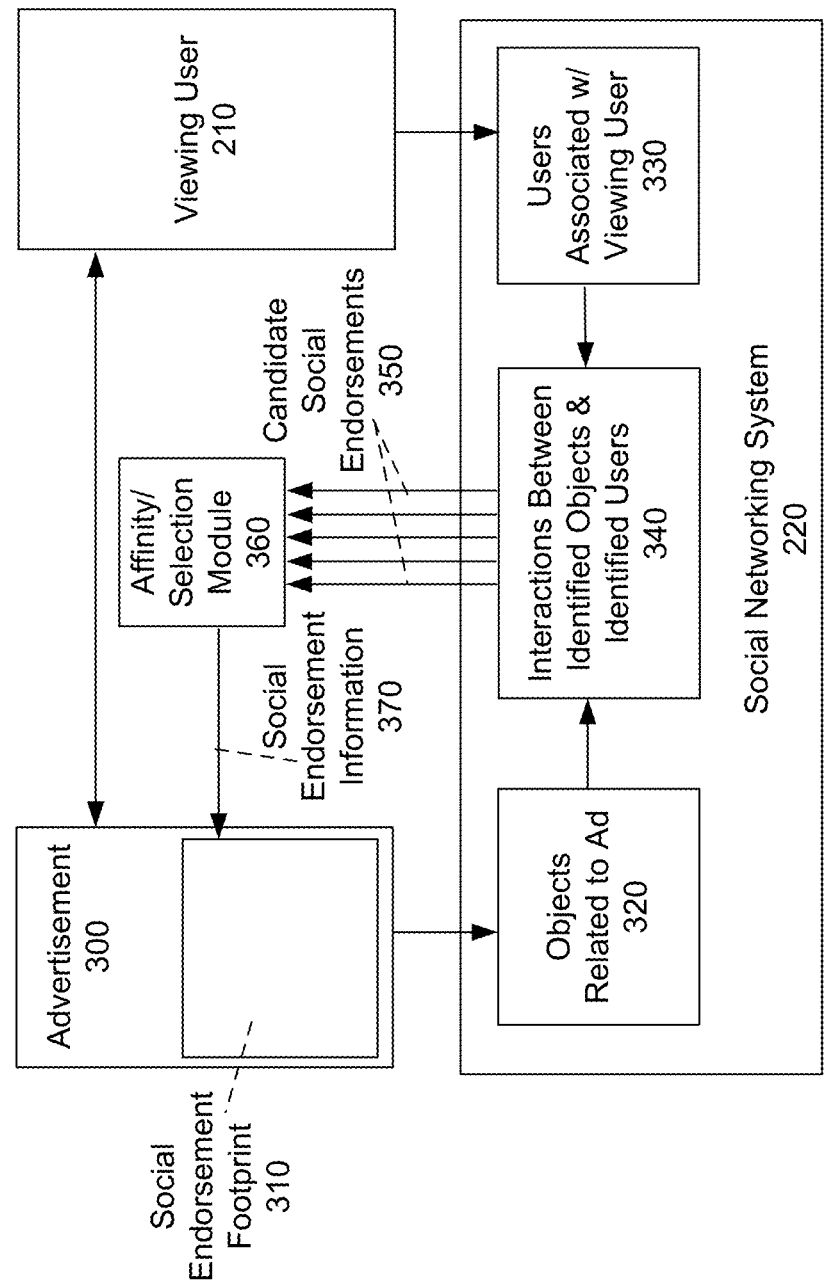
FIG. 3 is a block diagram illustrating a process for selecting social endorsement information from one or more candidate social endorsements for display with an advertisement, according to one embodiment of the invention.

FIG. 3 is a block diagram illustrating a process for selecting social endorsement information from one or more candidate social endorsements for display with an advertisement, according to one embodiment of the invention. Social endorsement information 370 may be selected in response to a request for social endorsement information 370. In one embodiment, this request comes from an ad 300 itself. For instance, the ad 300 may have executable code embedded within the ad 300 that when executed, transmits a request for social endorsement information 370 to the social networking system 220 or other entity. In some embodiments, the third-party publisher displaying the ad 300 requests the social endorsement information 370. In some embodiments, the viewing user 210 transmits the user's identity to the ad 300 or the third-party publisher displaying the ad 300. The viewing user 210 may be identified to the ad 300 or third-party publisher either prior to or after the request for social endorsement information 370. In some embodiments, the viewing user 210 is not identified by the ad 300 or the third-party publisher; instead, the viewing user 210 may transmit the user's identity to the social networking system 220, either at the request of the ad 300, the third-party publisher, the social networking system 220, or any third-party entity. The viewing user 210 may identify himself in many ways, such as via an IP address, a cookie storing the user's identity, an interface with the social networking system 220 which allows the ad 300 or third-party publisher to receive the user's identity from the social networking system 220 when the viewing user 210 is signed into the social networking system 220, or any other suitable means of identification.

Social networking system interactions 340 between objects 320 related to the ad 300 and users 330 associated with the viewing user 210 are identified. In one embodiment, this comprises first identifying social networking system objects 320 related to the ad 300, and then subsequently identifying social networking system users 330 who are associated with the viewing user 210. In an alternative embodiment, users 330 associated with the viewing user 210 are first identified, and objects 320 related to the ad 300 are subsequently identified. In yet another embodiment, objects 320 related to the ad 300 and users 330 associated with the viewing user 210 are concurrently identified. When objects 320 related to the ad 300 and users 330 associated with the viewing user 210 are identified, interactions 340 between the users 330 and the objects 320 may be identified. Alternatively, in one embodiment, only users 330 related to the viewing user 210 that have interacted with objects 320 are identified. Any method or order of identifying one or more interactions 340 between one or more objects 320 related to ad 300 and one or more users 330 associated with the viewing user 210 may be used.

Social networking system objects 320 related to the ad 300 may be identified in a variety of ways. In one embodiment, the ad 300 contains ad tags. These ad tags may identify particular objects with the social networking system 220. For instance, an ad tag may identify a fan page for a particular punk band by the URL for the fan page, a social networking system index number for the fan page, key words which the social networking system 220 analyzes to identify the fan page, or any other method suitable for identifying an object within the social networking system 220 by the contents of an ad tag. Alternatively, the ad server 230, advertiser 240 or any other entity may identify objects 320 in the social networking system 220 related to the ad 300. This identification may occur separately or in conjunction with the transmission of the ad 300, and may involve communication between the ad server 230, the advertiser 240, a third party publisher or any other entity and the social networking system 220. For example, the advertiser 240 may provide an ad 300 for a shoe sale to a third-party publisher, and may communicate to the social networking system 220 the URL of the social networking system web page for the company that makes the shoe, the brand of shoe associated with the sale (which the social networking system 220 can use to identify a group dedicated to the shoe brand), and a store near the user 220 which sells the shoe (which the social networking system 220 can use to identify communications made about the store).

In the event that the ad server 230, the advertiser 240, a third-party publisher or any other entity fails to provide information or data (such as ad tags or the like) which the social networking system 220 can use to identify objects 320 in the social networking system 220 related to the ad 300, the social networking system 220 can identify related objects 320 with various other means. In one embodiment, the identity of the ad 300 itself is provided to the social networking system 220. In such instances, the social networking system 220 may identify objects 320 related to the ad in a pre-designated index which correlates ads to objects related to the ads. This pre-designated index may be populated by advertisers or any other party. In one embodiment, if the identity of the ad 300 is provided, the social networking system 220 determines which objects have been identified previously as related to the ad 300, and uses this as a basis for identifying objects 320 related to the ad 300.

In an embodiment where the ad 300 itself is provided to the social networking system 220 (instead of ad tags or other identifying information), the social networking system 220 may scan or analyze the ad 300 to identify characteristics, properties, objects or any other identifying features of the ad 300; this may involving scanning the text of the ad 300, identifying images in the ad 300, searching the internet for websites displaying the ad 300 and scanning or parsing the contents of these websites, or any other method of identifying the contents or components of the ad 300 or social networking system objects related to the ad 300. In this embodiment, once the characteristics, properties and features of the ad 300 are determined, the social networking system 220 may identify objects 320 related to the ad 300 using any means necessary. For example, if an ad 300 is received, the social networking system 220 may scan the ad 300 and discover that it contains the phrases "DVD" and "Phil's Movie Store" and an image of the "The Godfather" movie poster. In addition, the social networking system 220 may search the Internet for the ad 300 and may discover that it was displayed on a popular website dedicated to the movies. The social networking system 220 may then identify a social networking system event for a DVD sale at Phil's Movie Store, the fan page for the popular website, and the concept "The Godfather" (for instance, this concept may comprise a node in the social networking system 220 that users who list The Godfather as a favorite movie would be connected to) as objects 320 related to the ad 300. These examples are merely illustrative; any suitable means of identifying objects 320 related to the ad 300 may be used.

Social networking system users 330 who are associated with the viewing user 210 may be identified. In one embodiment, this comprises identifying all social networking system users who are "friends" with the viewing user 210 in the context of the social networking system 220. In another embodiment, only a subset of the friends of the viewing user 210 are identified; this subset may be a group defined by one or more particular characteristics (such as relatives of the viewing user 210), may be selected by other criteria, or may be randomly selected. In an alternative embodiment, social networking system users 330 are identified that are not explicitly friends with the viewing user 210, but instead are associated with the viewing user 210 in another way. For instance, users 330 may be identified based on a common friend with the viewing user 210, based on common user profile information (the same favorite movie, attended the same high school, etc.), based on membership in the same network, based on demographic data (e.g., the same geographic location), or based on any trait, characteristic, information, feature or property. In one embodiment, the social networking system 220 uses a social graph to determine which users 330 are connected to the viewing user 210; in such instances, the social networking system 220 may identify users 330 whose nodes are connected with the viewing user's node by an edge. In one embodiment, only users 330 associated with the viewing user 210 who have interacted with one or more identified objects 320 are identified. Any suitable method of identifying users 330 either associated with viewing user 210 or having interacted with objects 320 may be used.

Interactions 340 between users 330 and objects 320 are identified. As mentioned above, interactions 340 may take several forms; for example, if a user associated with the viewing user 210 joined a group that was related to ad 300, this interaction 340 may be identified. Likewise, an interaction 340 may exist between an object 320 and a user 330, but the interaction 340 may not be identified. In one embodiment, a single user 330 associated with viewing user 210 may interact with two or more objects 320 related to ad 300; none, one, two or more of these interactions 340 may be identified. In another embodiment, an identified user 330 may not have interacted with any object 320. Likewise, an object 320 may not have been interacted with by any user 330. The interaction 340 may occur outside of the context of the social networking system 220; in such instances, the interaction 340 may be communicated to the social networking system 220.

Interactions 340 may be identified in various ways. In one embodiment, every interaction 340 between objects 320 and users 330 is identified. In another embodiment, only certain interactions 340 are identified. Interactions 340 may be identified based on the interaction type, the objects 320 interacted with, the interacting users 330, the identity of the viewing user 210, the ad 300, or any other characteristic, property or feature necessary to suitably identify interactions 340. For instance, in one embodiment, only interactions 340 comprising purchasing products or services may be identified. Likewise, in one embodiment, only interactions 340 between users 330 who are relatives of viewing user 210 and objects 320 that are fan pages may be identified. For a single user 330 who has interacted with more than one object 320, only one, more than one, or none of these interactions 340 may be identified. For instance, in one embodiment, if the user 330 purchased a car and joined a social networking system group dedicated to the model of car, the car purchase may be the only interaction identified or vice versa.

In one embodiment, one or more identified interactions are associated with the correlated interacting user 330 and the interacted upon object 320 to create one or more candidate social endorsements 350. Accordingly, each of these one or more candidate social endorsements 350 comprise information describing a social networking system interaction 340 between a user 330 associated with the viewing user 210 and an object 320 related to the ad 300. Thus, in one embodiment, each candidate social endorsement 350 could be used as social endorsement information 370.

An affinity score may be computed for each candidate social endorsement 350 between the candidate social endorsement 350 and the viewing user 210. In one embodiment, the affinity score is computed by an affinity/selection module 360. In one embodiment, the affinity/selection module 360 comprises two separate and distinct modules. All or part of the affinity/selection module 360 functionality may be implemented within or external to the social networking system 220. The affinity score may be computed to represent the anticipated likelihood that the viewing user 210 will click on the ad 300, the relevance of the ad 300 or candidate social endorsement 350 to the viewing user, or any other quantifiable measure related to the viewing user 210, the ad 300, the social endorsement information 370 or any other entity, property, characteristic, value, information, data or concept. In one embodiment, affinity scores are not calculated for candidate social endorsements, wherein the candidate social endorsement is selected using other criteria.

Affinity scores may be computed based on the type of interaction 340 represented by each candidate social endorsement 350. For example, the affinity score for a candidate social endorsement 350 representing a purchase of a book may be greater than an affinity score for a candidate social endorsement 350 representing the posting of a review of the book, which in turn may be greater than an affinity score for a candidate social endorsement 350 representing the clicking of the "like" button for the object representing the book. Affinity scores may also be computed based on the object 320 or user 330 represented by each candidate social endorsement 350. For example, fan pages may be weighed higher than user-uploaded pictures, and relatives of the viewing user 210 may be weighed higher than elementary school classmates. Affinity scores may be computed based on the type of advertisement 300; for instance, candidate social endorsements 350 representing purchases may have higher affinity scores than other candidate social endorsements 350 when the ad 300 involves a sale at a shoe store. Affinity scores may be computed based on any component, module, entity, information, user, characteristic, property, value, data or concept. Affinity scores may represent any kind of measure of a viewing user's possible interest in anything related to the social endorsement, whether based on historical information or any other prediction or measurement means.

Affinity scores may be pre-designated for particular candidate social endorsements 350, particular viewing users 210, or particular ads 300. In addition, affinity scores may be computed according to pre-designated formulas or equations. Alternatively, affinity scores may be computed dynamically, depending on the viewing user 210, ad 300, candidate social endorsement 350, or any other property, value, entity, information, characteristic or data. Affinity scores may be computed based on multiple factors or a single factor. Affinity scores may also decay over time. In one embodiment, an affinity score may be computed based on several factors, one or more of which may decay over time and one or more of which may not decay over time. The rates of decay for affinity scores may depend on the type of interaction 340, type of object 320 or identity of the user 330. For example, the rate of decay for posting a message to fan page profile may be faster than the rate of decay for planning a party at a particular night club using a social networking system's calendar function.

The affinity/selection module 360 selects a candidate social endorsement 350 to provide as social endorsement information 370. In one embodiment, this selection is based on the candidate social endorsement affinity scores. The candidate social endorsement 350 with the highest affinity score may be selected. In another embodiment, a candidate social endorsement 350 may be selected based only in part on the affinity score. In yet another embodiment, a candidate social endorsement 350 may be selected based on the rate of decay of the affinity score. Any suitable method of selecting a candidate social endorsement 350 based on affinity scores to provide as social endorsement information 370 may be used. Alternatively, a candidate social endorsement 350 may be selected without consideration to affinity scores. In one embodiment, affinity scores are not calculated, and a candidate social endorsement 350 is selected based upon other criteria. In one embodiment, multiple candidate social endorsements may be selected and used as social endorsement information 370. Alternatively, multiple candidate social endorsements may be aggregated and displayed as social endorsement information 370. In one embodiment, the social endorsement information 370 is displayed in a social endorsement footprint 310 within the ad 300. In another embodiment, the social endorsement information 370 is displayed external to an ad 300. In yet another embodiment, a third-party publisher adjusts the dimensions or format of the ad 300 in order to display the social endorsement information 370.

Figure 4:
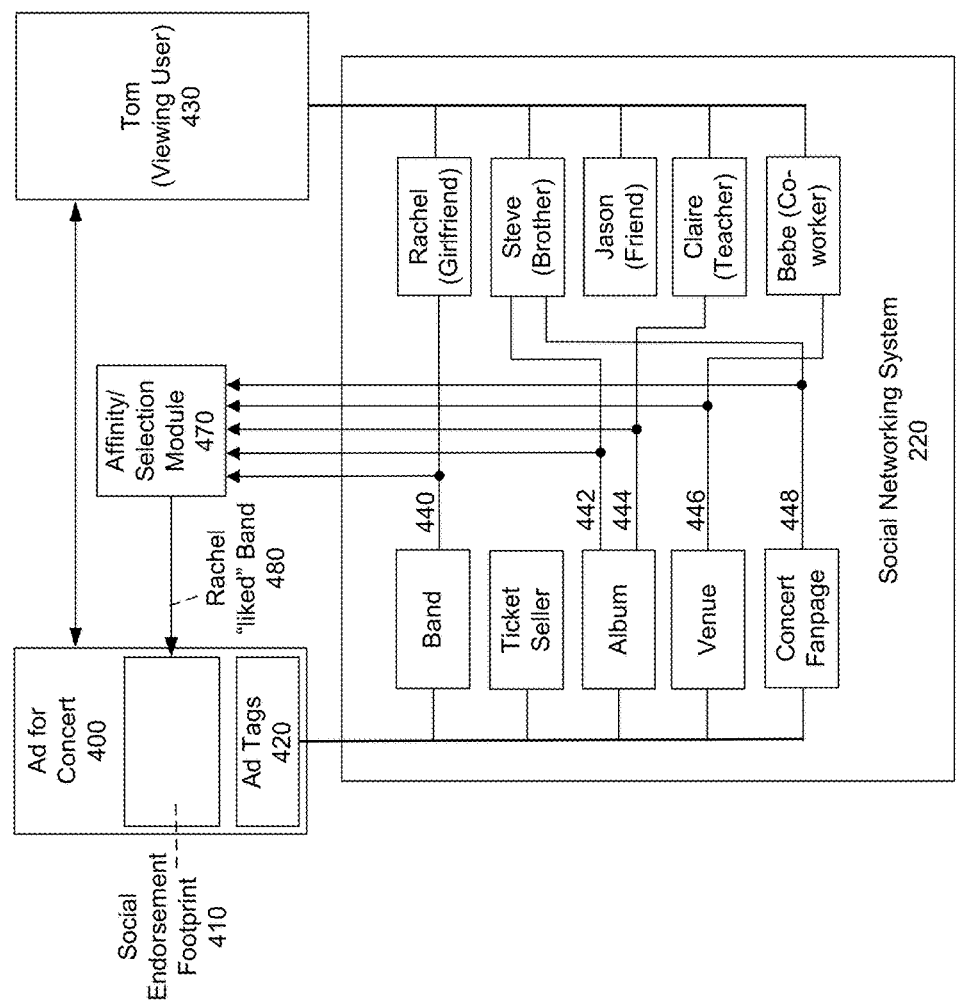
FIG. 4 is a block diagram of a process for selecting social endorsement information for a particular example, according to one embodiment of the invention.

FIG. 4 is a block diagram of a process for selecting social endorsement information for a particular example, according to one embodiment of the invention. In this example, the ad 300 is an ad advertising a concert 400. The concert ad 400 comprises a social endorsement information footprint 410 and ad tags 420. The ad tags 420 identify objects 320 in the social networking system 220; in particular, the objects 320 identified are the band performing the concert, the ticket seller for the concert, an album produced by the band, the venue of the concert, and a fan page dedicated to the concert.

The viewing user 210 in this example is Tom 430. Tom is identified to the social networking system 220, and users 330 of the social networking system 220 associated with Tom are identified. These users 330 are girlfriend Rachel, brother Steve, friend Jason, teacher Claire, and co-worker Bebe, the first four of which are "friends" with Tom in the context of the social networking system, and the fifth (Bebe) is automatically determined by the social networking system 220 because both Bebe and Tom list their employer in their profile. Interactions between the objects 320 and the users 330 are identified; in this example, there are five such interactions. Rachel clicked 440 the like button on the web page dedicated to the band. Steve bought 442 the album by the band and posted 448 a message to the concert fan page. Claire also bought 444 the album, and Bebe recently checked 446 into the venue using a mobile device, but for a different concert. Note that Jason did not interact with any of the objects 320 related to the concert ad 400, and none of the users 330 interacted with the ticket seller object.

These five interactions comprise candidate social endorsements 350. The affinity/selection module 470 of this example computes an affinity score for each of the candidate social endorsements 350. In this example, affinity scores are computed primarily based on the strength and type of the relationship between the user 330 in the interaction 340 of the candidate social endorsement 350 and the viewing user 210, giving the highest affinity score to the candidate social endorsement 350 comprising Rachel clicking 440 the like button on the band's social networking system web page.

Further, in this example, the candidate social endorsement 350 with the highest affinity score is selected and provided as social endorsement information 370; thus social endorsement information comprising "Rachel likes band" 470 is provided to the concert ad 400. It should be noted that this example is merely intended to be illustrative, and is not intended to be restrictive in any way.

Figure 5:
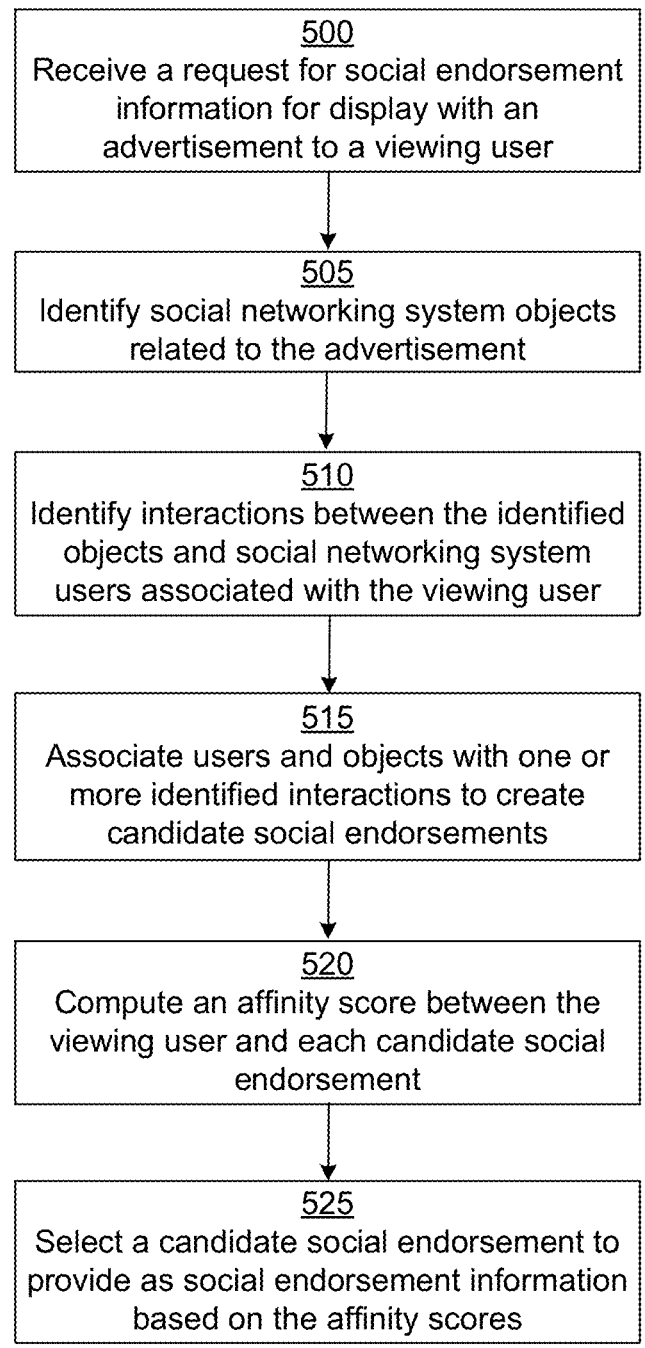
FIG. 5 is a flow chart of a process for selecting social endorsement information for display with an advertisement, in accordance with one embodiment of the invention.

FIG. 5 is a flow chart of a process for selecting social endorsement information for display with an advertisement, in accordance with one embodiment of the invention. First, a request for social endorsement information 370 for display with an advertisement 300 to a viewing user 210 is received 500. Next, social networking system objects 320 related to the ad 300 are identified 505. Interactions 340 between the identified objects 320 and social networking system users 330 associated with the viewing user 210 are identified 510. Candidate social endorsements 350 are created by associating 515 one or more of the identified interactions 340 with the interacting users 330 and the interacted-upon objects 320. Affinity scores are computed 520 for each candidate social endorsement 350, representing the affinity between the candidate social endorsement 350 and the viewing user 210. Finally, a candidate social endorsement 350 is selected 525 to provide as social endorsement information 370 based at least in part on the computed affinity scores for the candidate social endorsement 350.

Social Endorsement Selection

In some embodiments, the affinity/selection module 120 can select among candidate social endorsements for an advertisement based on an amount of available social endorsement information display space. For instance, the affinity/selection module 120 can select among candidate social endorsements based on a social endorsement footprint within an advertisement, based on a social endorsement footprint within a social networking system interface, and the like. In some embodiments, the amount of available social endorsement information display space is based on one or more of a display size of a device displaying the advertisement or the social networking system interface, based on a size of the social networking system interface, based on a location and size of a social endorsement display interface within the social networking system interface, based on a size of an advertisement or a social endorsement interface within the advertisement, and the like.

By selecting among candidate social endorsements based on an available social endorsement information display space, the affinity/selection module 120 can beneficially increase the value of the displayed social endorsement information. For instance, the amount of available social endorsement information within a social networking system interface displayed on a desktop computer may be less than the amount of available social endorsement information within a social networking system interface displayed on a mobile phone. In this example, a first social endorsement associated with a highest affinity can be selected for display on the mobile phone, and two social endorsements associated with lesser affinities (but a greater combined affinity) can be selected for display on the desktop computer. In such an example, the two social endorsements are associated with a greater combined affinity than the first social endorsement, but are too big to be displayed within the social networking system interface displayed on the mobile phone. Thus, the affinity/selection module 120 can optimize the value of providing social endorsement information based on the available space in each medium by selecting the first social endorsement for the mobile phone interface and by selecting the two social endorsements for the desktop computer.

The affinity/selection module 120 can identify the amount of social endorsement information display space available for displaying social endorsement information, for instance in response to receiving a request for social endorsement information. In some embodiments, the amount of social endorsement information display space available on a particular medium or within a particular interface is included within the request. In other embodiments, the affinity/selection module 120 can request the amount of social endorsement information display space available from a client device, an application running on the client device, or a social networking system interface. In yet other embodiments, the amount of available social endorsement display space can be determined based on the advertisement to be displayed in conjunction with the social endorsement information, based on a pre-determined amount of display space, or based on space estimates associated with the request, the social networking system, or the identity of the viewing user.

As used herein, the "amount of available social endorsement information display space" can refer to the dimensions of a social endorsement information footprint within an advertisement or social networking system interface; the width, height, or both of a display area into which social endorsement information will be displayed; a number of characters of social endorsement information that can be displayed; a number of and/or dimensions of social endorsement images that can be displayed; a number of pixels in which social endorsement information can be displayed; or any other suitable measurement of displayed social endorsement information. For the purposes of simplicity, reference to an available social endorsement information display space for the remainder of the description will be limited to a width of a display area into which social endorsement information can be displayed unless otherwise noted.

The affinity/selection module 120 can, as described above, identify a plurality of candidate social endorsements in response to receiving a request for social endorsement information for display with an advertisement, each associated with one or more of a social networking system object associated with the advertisement, one or more social networking system users, and the like. Each of the identified candidate social endorsements can additionally be associated with a display space. Upon identifying an amount of available social endorsement information display space, the affinity/selection module 120 can generate sets of candidate social endorsements such that, for each set of candidate social endorsements, the sum of display space associated with the candidate social endorsements in the set of candidate social endorsements is less than or equal to the identified amount of available social endorsement information display space. For example, the affinity/selection module 120 can generate every combination of candidate social endorsements such that the sum of widths associated with the candidate social endorsements is less than or equal the width of the available social endorsement information display space. In some embodiments, the affinity/selection module 120 generates sets of candidate social endorsements each including candidate social endorsements associated with above-threshold affinities. It should be noted that a set of candidate social endorsements can include one candidate social endorsement or more than one candidate social endorsement.

Figure 6:
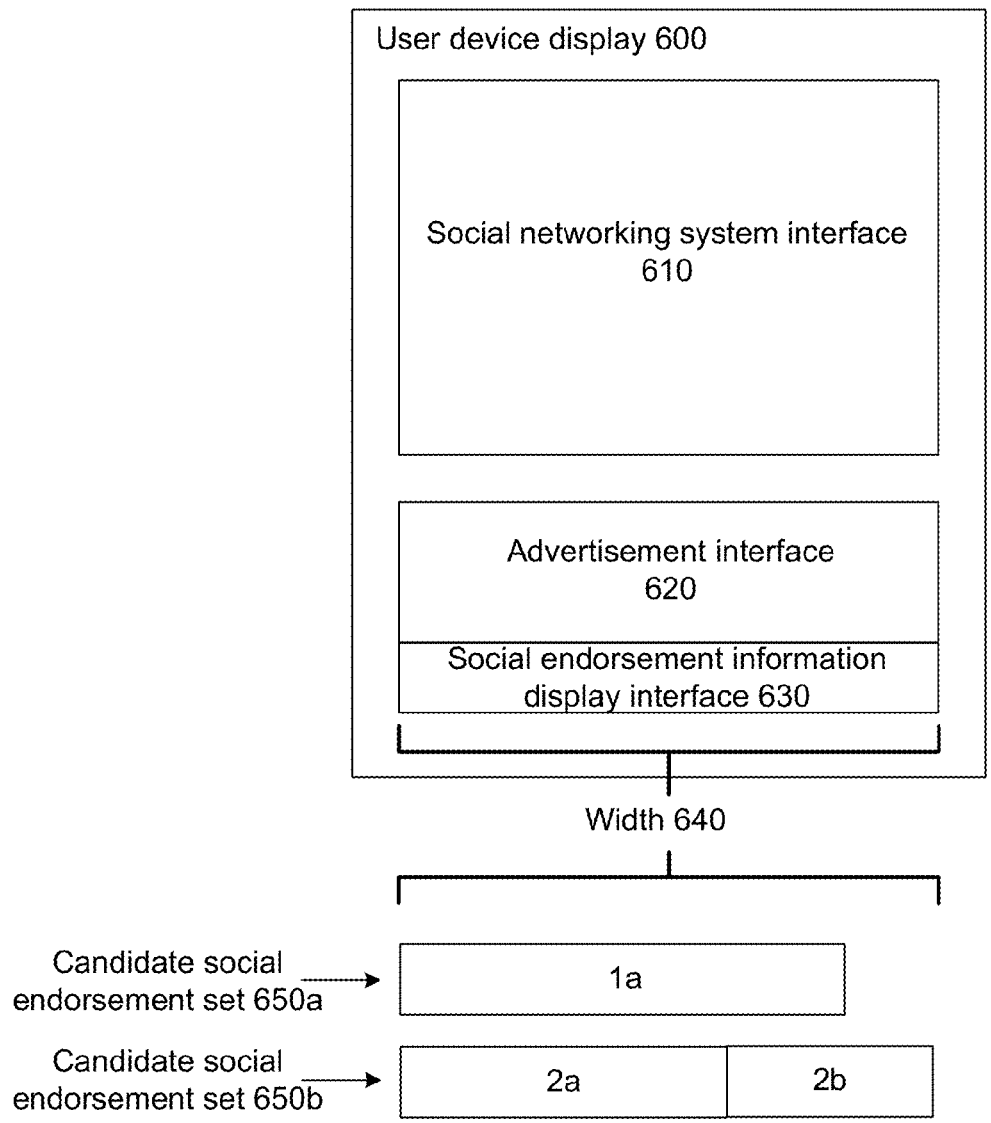
FIG. 6 illustrates a social endorsement information display interface and sets of candidate social endorsements, in accordance with one embodiment of the invention.

FIG. 6 illustrates a social endorsement information display interface and sets of candidate social endorsements, in accordance with one embodiment of the invention. In the embodiment of FIG. 6, a user device display 600 includes a social networking system interface 610 (for displaying social networking system content), an advertisement interface 620 (for displaying an advertisement), and a social endorsement information display interface 630 (for displaying social endorsement information corresponding to the advertisement). Although shown separately in the embodiment of FIG. 6, it should be noted that the social endorsement information display interface 630 can be included within the advertisement interface 620.

The social endorsement information display interface 630 is associated with a width 640. As described above, the affinity/selection module 120 can generate a plurality of sets of candidate social endorsements based on the width 640. In the embodiment of FIG. 6, two sets of candidate social endorsements, set 650*a* and set 650*b*, are generated. Set 650*a* includes a candidate social endorsement 1*a*, and set 650*b* includes two candidate social endorsements, 2*a* and 2*b* (each drawn to width). Note that the total widths of all candidate social endorsements in each of sets 650*a* and 650*b* is less than or equal to the width 640 of the social endorsement information display interface 630. It should be noted that in other embodiments, any number of sets of candidate social endorsements can be generated.

The affinity/selection module 120 ranks the sets of candidate social endorsements. The sets of candidate social endorsements can be ranked based on affinities between each candidate social endorsement within each set of candidate social endorsements and one or more of: a viewing user, one or more objects associated with the advertisement, one or more users connected to the viewing user, or any other suitable criteria. In some embodiments, the sets of candidate social endorsements are ranked based on a total sum of affinities of candidate social endorsements in each set of candidate social endorsements. In some embodiments, the sets of candidate social endorsements are ranked by weighting the affinities associated with each candidate social endorsement and summing the weighted affinities for each set of candidate social endorsements. For example, each set of candidate social endorsements can be ordered such that a first candidate social endorsement is associated with a first position (such as a leftmost position), a second candidate social endorsements is associated with a second position (adjacent to the first position), and so forth. In such embodiments, the affinities associated with each candidate social endorsement can be weighted with a weighting factor based on the position of the candidate social endorsement within the ordered candidate social endorsements. For example, the weighting factor for a candidate social endorsement in a first position can be "1.0", the weighting factor for a candidate social endorsement in a second position can be "0.9", and so forth, with weighting factors decreasing as the distance between the position of a candidate social endorsement and the first position increases.

The affinity/selection module 120 can select among the ranked sets of candidate social endorsements, for instance by selecting the highest ranked set of candidate social endorsements. The selected set of candidate social endorsements is then provided for display in conjunction with an advertisement, for instance by providing the selected set of candidate social endorsements to a user device associated with a viewing user. In the embodiment of FIG. 6, if the affinity of the candidate social endorsement 1*a* is determined to be "3.0", and the affinities of the candidate social endorsements 2*a* and 2*b* are determined to be "1.8" and "1.6" respectively, a ranking score for the set 650*a* can be determined to be "3.0", and a ranking score for the set 650*b* can be determined to be "(1.8*1.0)+(1.6*0.9)" (the affinities for the candidate social endorsements 2*a* and 2*b* each multiplied by a weighting factor corresponding to the position of each candidate social endorsement) or "3.24". In such an embodiment, the affinity/selection module 120 can select the set of candidate social endorsements associated with the highest ranking score (set 650*b* in this example) for display within the social endorsement information display interface 630.

In some embodiments, the affinity/selection module 120 can combine candidate social endorsements within a set of candidate social endorsements. For example, if the selected set of candidate social endorsements includes a first social endorsement "Friend A likes Restaurant Z" and a second social endorsement "Friend B likes Restaurant Z", the affinity/selection module 120 can combine these social endorsements to create a combined social endorsement "Friend A and Friend B like Restaurant Z." Upon combining candidate social endorsements within a set of candidate social endorsements, as the total amount of display space required to display the set of candidate social endorsements is reduced, an additional candidate social endorsement can be included within the set of candidate social endorsements. In such embodiments, the amount of display space required to display the additional candidate social endorsement and the combined social endorsements within the set of candidate social endorsements cannot be greater than the identified amount of available display space associated with the request for social endorsement information. In some embodiments, the affinity/selection module 120 can combine social endorsements within a selected set of social endorsements to form a combined social endorsement before providing the selected set of social endorsements for display. In some embodiments, candidate social endorsements within a set of candidate social endorsements are images, and combining candidate social endorsements comprises combining images to form a combined candidate social endorsement image.

In some embodiments, a candidate social endorsement within a set of candidate social endorsements can be replaced with a shorter version of the candidate social endorsement in order to decrease the total amount of display space required to display the set of candidate social endorsements. For example, a candidate social endorsement "Timothy Johnson purchased Brand X golf clubs" can be shorted to "Tim purchased Brand X clubs". In such embodiments, a user's name within a candidate social endorsement can be replaced with a shorter version of the name, a nickname of the user, or a relationship between the user and the viewing user (e.g., "Jeremiah Harper" can be replaced with "your brother"). In some embodiments, a social networking system object identified within a candidate social endorsement can be replaced with a shorter version of the object (e.g., "McDonald's Big Mac" can be replaced with "Big Mac"). Upon replacing a candidate social endorsement with a set of candidate social endorsements with a shorter version of the candidate social endorsement, additional candidate social endorsements can be added to the set of candidate social endorsements so long as the space required to display the set of candidate social endorsements is not greater than the identified space available to display social endorsement information.

Figure 7:
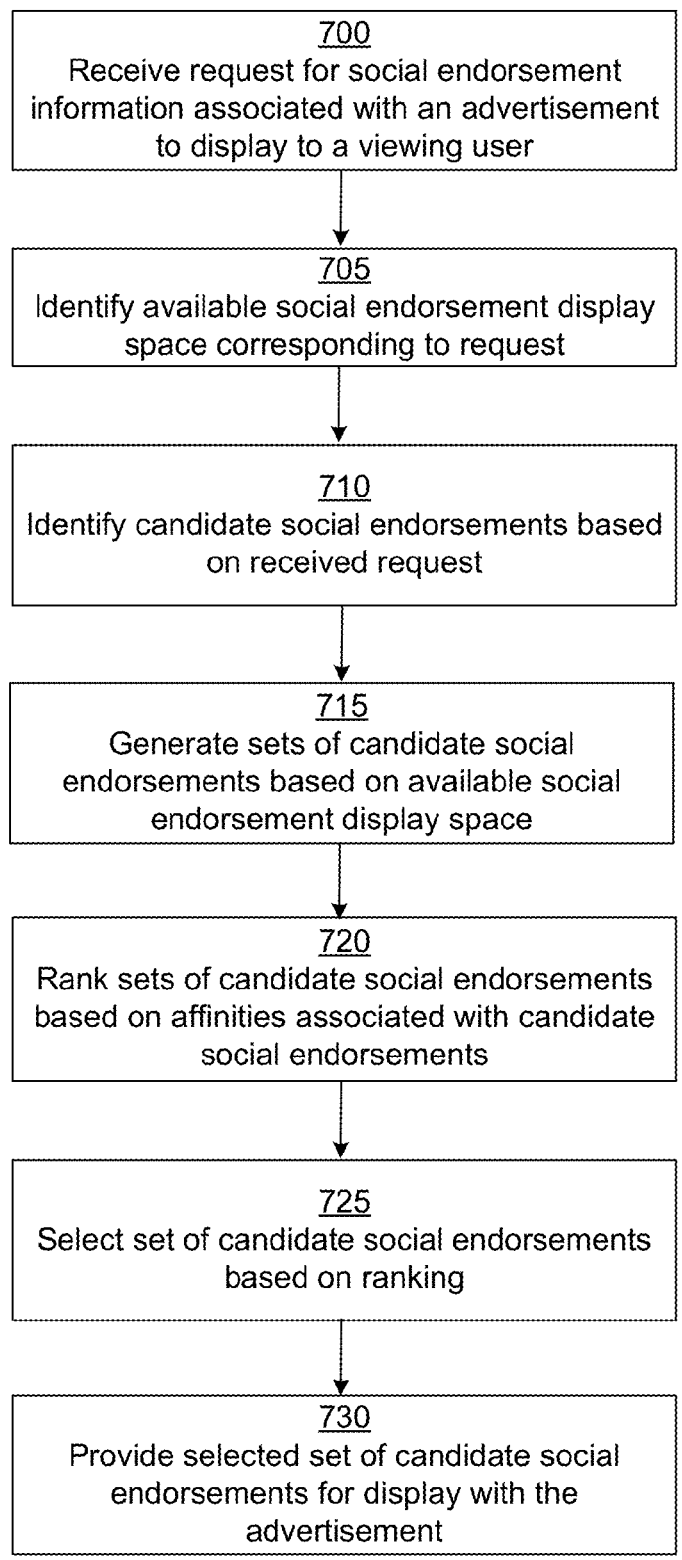
FIG. 7 is a flow chart of a process for selecting a set of candidate social endorsements for display within an advertisement, in accordance with one embodiment of the invention.

FIG. 7 is a flow chart of a process for selecting a set of candidate social endorsements for display within an advertisement, in accordance with one embodiment of the invention. A request is received 700 for social endorsement information associated with an advertisement to display to a viewing user. An amount of available social endorsement display space is identified 705 in response to the request. Candidate social endorsements are identified 710 in response to the received request, and sets of candidate social endorsements are generated 715 based on the identified available social endorsement display space such that the total amount of space required to display each set of candidate social endorsements does not exceed the identified available social endorsement display space. The sets of candidate social endorsements are ranked 720 based on affinities associated with candidate social endorsements. A set of candidate social endorsements is selected 725 based on the rankings, and the selected set of candidate social endorsements is provided 730 for display in conjunction with the advertisement.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computer, a request for social endorsement information associated with an advertisement to display to a viewing user, wherein the viewing user is a user of a social networking system, and wherein the advertisement is associated with one or more objects within the social networking system;
   identifying, by the computer, an amount of available social endorsement display space corresponding to the received request;
   identifying, by the computer, a plurality of candidate social endorsements associated with the advertisement, each candidate social endorsement associated with an amount of display space, an affinity associated with the viewing user, and an object associated with the advertisement;
   generating a plurality of sets of candidate social endorsements, each set of candidate social endorsements comprising one or more candidate social endorsements such that the sum of the amount of display space associated with each candidate social endorsement within the set of candidate social endorsements is less than or equal to the identified amount of available social endorsement display space;
   determining, for each set of candidate social endorsements, a ranking score based on the affinities associated with each candidate social endorsement in the set of candidate social endorsements;
   selecting a set of candidate social endorsements based on the determined ranking scores; and
   providing the selected set of candidate social endorsements for display within the available social endorsement display space.

2. The computer-implemented method of claim 1, wherein the request is received from a user device associated with the viewing user, and wherein identifying an amount of available social endorsement display space comprises identifying an amount of space within an interface of the user device associated with the display of social endorsement information.

3. The computer-implemented method of claim 2, wherein the user device or an application associated with the user device is configured to provide the amount of available social endorsement display space to the computer within the request for social endorsement information.

4. The computer-implemented method of claim 1, wherein the identifying an amount of available social endorsement display space comprises identifying an amount of space within the advertisement associated with the display of social endorsement information.

5. The computer-implemented method of claim 1, wherein the identified amount of available social endorsement display space comprises an identified width, and wherein the amount of display space associated with each candidate social endorsement comprises a corresponding width.

6. The computer-implemented method of claim 1, wherein each candidate social endorsement comprises a text description of an associated interaction between a user of the social networking system and an object associated with the advertisement.

7. The computer-implemented method of claim 1, wherein each candidate social endorsement comprises text associated with a user of the social networking system.

8. The computer-implemented method of claim 7, wherein the text associated with a user comprises a full name of the user.

9. The computer-implemented method of claim 7, wherein the text associated with a user comprises a nickname or partial name of the user.

10. The computer-implemented method of claim 7, wherein the text associated with a user comprises a relationship between the user and the viewing user.

11. The computer-implemented method of claim 1, wherein each candidate social endorsement comprises an image associated with a user of the social networking system, the user associated with an object associated with the advertisement.

12. The computer-implemented method of claim 1, wherein at least a first set of candidate social endorsements comprises one social endorsement, and wherein at least a second set of candidate social endorsements comprises a plurality of social endorsements.

13. The computer-implemented method of claim 1, wherein determining a ranking score for a set of candidate social endorsements comprises determining a sum of the affinities associated with the candidate social endorsements within the set of candidate social endorsements.

14. The computer-implemented method of claim 1, wherein the candidate social endorsements within each set of candidate social endorsements are ordered based on the affinities associated with the candidate social endorsements.

15. The computer-implemented method of claim 14, wherein determining a ranking score for a set of candidate social endorsements comprises determining a sum of weighted affinities associated with the candidate social endorsements within the set of candidate social endorsements, wherein each weighted affinity comprises a product of an affinity associated with a candidate social endorsement and a weighting factor corresponding to an ordered position of the candidate social endorsement within the set of candidate social endorsements.

16. The computer-implemented method of claim 15, wherein the weighting factor corresponding to a first ordered position of a candidate social endorsement within the set of candidate social endorsements is 1, and wherein the weighting factors corresponding to other ordered positions of candidate social endorsements within the set of candidate social endorsements are less than 1.

17. The computer-implemented method of claim 1, further comprising:

combining the candidate social endorsements within the selected set of candidate social endorsements;
wherein providing the selected set of candidate social endorsements comprises providing the combined candidate social endorsements.

18. The computer-implemented method of claim 17, wherein combining the candidate social endorsements comprises combining text associated with the candidate social endorsements into combined text representative of the candidate social endorsements.

19. The computer-implemented method of claim 17, wherein combining the candidate social endorsements comprises combining images associated with the candidate social endorsements into a combined image representative of the candidate social endorsements.

20. A computer-implemented system comprising:
a computer processor; and
a non-transitory computer-readable storage medium storing executable computer program instructions that, when executed by the computer processor, perform steps comprising:
receiving a request for social endorsement information associated with an advertisement to display to a viewing user, wherein the viewing user is a user of a social networking system, and wherein the advertisement is associated with one or more objects within the social networking system;
identifying an amount of available social endorsement display space corresponding to the received request;
identifying a plurality of candidate social endorsements associated with the advertisement, each candidate social endorsement associated with an amount of display space, an affinity associated with the viewing user, and an object associated with the advertisement;
generating a plurality of sets of candidate social endorsements, each set of candidate social endorsements comprising one or more candidate social endorsements such that the sum of the amount of display space associated with each candidate social endorsement within the set of candidate social endorsements is less than or equal to the identified amount of available social endorsement display space;
determining, for each set of candidate social endorsements, a ranking score based on the affinities associated with each candidate social endorsement in the set of candidate social endorsements;
selecting a set of candidate social endorsements based on the determined ranking scores; and
providing the selected set of candidate social endorsements for display within the available social endorsement display space.

* * * * *